(12) United States Patent
Bauer et al.

(10) Patent No.: US 10,410,101 B2
(45) Date of Patent: Sep. 10, 2019

(54) RFID DIGITAL PRINT/ENCODE

(71) Applicant: Avery Dennison Corporation, Pasadena, CA (US)

(72) Inventors: Richard K. Bauer, Beavercreek, OH (US); Neil Travis, Cheshire (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 13/708,024

(22) Filed: Dec. 7, 2012

(65) Prior Publication Data

US 2013/0161382 A1    Jun. 27, 2013

Related U.S. Application Data

(60) Provisional application No. 61/568,867, filed on Dec. 9, 2011.

(51) Int. Cl.
  *G06M 1/12*    (2006.01)
  *G06K 17/00*   (2006.01)
  *G06K 1/12*    (2006.01)

(52) U.S. Cl.
  CPC .......... *G06K 17/00* (2013.01); *G06K 1/121* (2013.01); *G06K 17/0025* (2013.01)

(58) Field of Classification Search
  CPC ... G06Q 20/401; G06K 19/025; G06K 19/027
  (Continued)

(56) References Cited

U.S. PATENT DOCUMENTS 6,481,907 B2 * 11/2002 Banach et al. ............. 400/615.2
6,848,616 B2 *  2/2005 Tsirline et al. ............... 235/449
(Continued)

FOREIGN PATENT DOCUMENTS

| EP | 1538552 | 6/2005 |
| EP | 1811429 | 7/2007 |
| WO | 2006/060536 | 6/2006 |

OTHER PUBLICATIONS

International Search Report and Written Opinion dated (Apr. 29, 2013), issued in corresponding International Application No. PCTUS12068426.
(Continued)

*Primary Examiner* — Daniel St Cyr
(74) *Attorney, Agent, or Firm* — Avery Dennison Retail Information Services, LLC

(57) ABSTRACT

A method, system and apparatus for printing and encoding RFID products may be disclosed. The method, system, and apparatus can include a printer which can read and program an RFID device contained in a label, tag, or any other desired product, and also print onto the product without damaging the RFID device. The method, system, and apparatus can further include a quality control system. In some exemplary embodiments, the products can be arranged into sheets or rolls, and multiple products can be printed or encoded at the same time or substantially simultaneously. In some exemplary embodiments, reader and antenna configurations can allow the encoding to occur in line, so that printing, encoding, variable data imaging, and finishing can all be completed in one continuous process.

15 Claims, 14 Drawing Sheets

(58) Field of Classification Search
USPC .......................................... 235/375, 385, 383
See application file for complete search history.

(56) References Cited

U.S. PATENT DOCUMENTS

| | | | |
|---|---|---|---|
| 7,398,054 B2* | 7/2008 | Tsirline et al. | 455/41.1 |
| 2011/0115611 A1* | 5/2011 | Tsirline et al. | 340/10.2 |
| 2011/0318477 A1* | 12/2011 | Sanbongi et al. | 427/58 |

OTHER PUBLICATIONS

International Preliminary Report on Patentability for International Application No. PCTUS12068426.

* cited by examiner

RFID DIGITAL PRINT/ENCODE

CROSS-REFERENCE TO RELATED APPLICATION

The present application claims the benefit of U.S. Provisional Patent Application No. 61/568,867 filed Dec. 9, 2011, which is incorporated herein by reference in its entirety.

BACKGROUND OF THE INVENTION

Current Radio-Frequency Identification (RFID) tags and labels are produced through the construction of an inlay which includes a chip connected to an antenna applied to a substrate. The inlay is then inserted into a single tag or label, or more particularly the tag or label stock that is used to make up the finished RFID device. These labels or tags are then printed by either conventional printing processes, such as flexographic processes, and then variable information may be printed either with the static information or singularly. The chips are then encoded in a printer which has a reader/encoding device or separately by a reader/encoding device. This method is slow and costly due to multiple steps that are involved in the manufacture of the product. In addition, such a method can only be accomplished typically one tag or label at a time per lane of manufacturing capability. The can result in higher cost, limited output, and limited product variation in terms of size, color, and complexity.

SUMMARY OF THE INVENTION

The present invention relates to a method, system and apparatus for printing and encoding RFID tags and labels which may then be associated with consumer products or other items which a manufacturer or retailer intends to track and or process for sale. The method, system, and apparatus can include at least one printer which can simultaneously, or substantially simultaneously read and program an RFID device contained in a label, tag, or any other desired product, such as a care label affixed to the interior of the garment, and also print onto the product or the label or tag for the product without damaging the RFID device. The method, system, and apparatus can further include a quality control system to make sure the printed information matches to the information that is encoded on to the RFID chip. In some exemplary embodiments, the products can be arranged into sheets or rolls that are provided in a continuous or sheet wise manner, and multiple products can be printed or encoded at the same time or substantially simultaneously. In some exemplary embodiments, reader and antenna configurations can allow the encoding to occur in line, so that printing, encoding, variable data imaging, and finishing can all be completed in one continuous process.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION OF THE INVENTION

Figure 1:
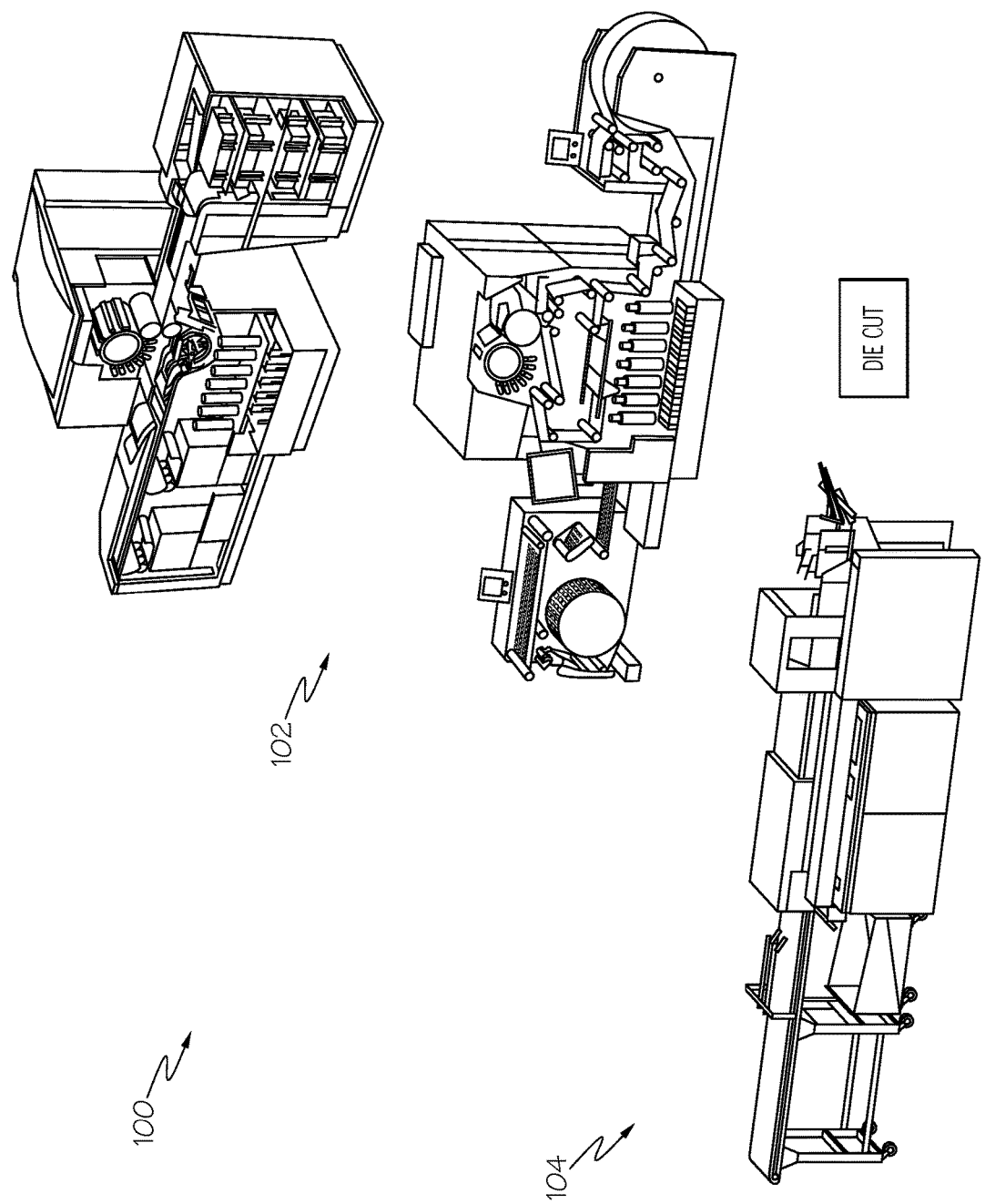
FIG. 1 shows an exemplary embodiment of a printer/encoder device.

Detailed Description of the invention aspects of the present invention are disclosed in the following description and related figures directed to specific embodiments of the invention. Those skilled in the art will recognize that alternate embodiments may be devised without departing from the spirit or the scope of the claims. Additionally, wellknown elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Generally referring to FIGS. 1-14 methods, systems and apparatuses for printing and encoding Radio-Frequency Identification (RFID) products can be disclosed. The methods, systems, and apparatuses can utilize a printer, that may include a reader and/or encoding device, which can read and program an RFID device, such as a RFID chip, that is contained in an inlay which may or may not be incorporated into a label, tag, or any other desired product, and which can also print onto the product without damaging or otherwise undesirably affecting the RFID device. The inlay may also be affixed directly to the product without necessarily being incorporated into a label or tag, such as through use of an adhesive to affix the inlay to the product. In some exemplary embodiments, the products can be arranged into sheets or rolls, and multiple products can be printed or encoded at one time, in a sequential manner, simultaneously or substantially simultaneously. In some exemplary embodiments, reader and chip/antenna configurations can allow the encoding to occur in line, so that printing, encoding, variable data imaging, and finishing can all be completed in one continuous process. As used herein a continuous process includes both a roll to roll configuration, and a sheet fed process in which there is no stopping of the process. Continuous may also include a slight incremental stopping, indexing, advancing or the like which does not last longer than a couple of seconds.

Printing as provided herein may be accomplished by using any number of processes, including impact and non-impact printers, flexographic, gravure, ink jet, electrostatic and the like just to provide some representative examples. Static printing may include company logos, manufacturers information, size, color and other product attributes. Variable printing may include identification numbers, bar codes, pricings, store location and such other information as a retailer may decide is required.

Exemplary RFID devices, e.g. inlays, tags, labels and the like are available from Avery Dennison RFID Company and Avery Dennison Retail Information Services of Clinton, S.C. and Framingham, Mass., respectively. Such devices may be provided in any number of antenna and size configurations depending on the needs or end-use applications for which the product is intended.

FIG. 1 shows an exemplary embodiment of a system which may include at least a printer and encoder 100 suitable for use in connection with the present invention. Printer/encoder 100 can include a print press 102. Print press 102 can include a printer, which can print through flexographic, offset, gravure, digital offset or xerographic digital processes, or any other desired print process. An exemplary printer is available from HP and marketed under the name Indigo®. Printer 102 can accept input information in any format, for example Portable Document Format (PDF), Personalized Print Markup Language (PPML), or any other desired format. The information is provided from a computer which may either be collocated with the printer 102 or may be provided in a remote location. The printer 102 may be connected to the computer via an intranet or over the Internet, depending on the requirements of the manufacturing operation. Printer or print press 102 can also include one or more RFID readers 106 and RFID encoders 108 (as shown in the following figures, such as for example FIG. 4) which can be arranged in any configuration, for example in a configuration that allows RFID encoding to occur in line, either before or after printing. In exemplary embodiments, printer or print press 102 can contain multiple RFID readers 106 and RFID encoders 108, arranged in such a way that allows multiple products, for example in sheet or roll form, to be printed and encoded as part of a continuous process. It should be understood that the reader and encoder can be combined in a single unit or provided in a two separate components. Print press 102 can isolate adjacent products from radio-frequency cross-coupling and interference using physical screening, for example with a moving shutter, electrical screening, for example using infrared light or an interfering carrier signal, or by any other desired method for providing electrical shielding.

Still referring to FIG. 1, Printer/encoder 100 can also have a quality control system 104, such as a vision inspection system, RFID test system or other device to ensure adequate quality in the unit. Quality control system 104 can be located in line with print press 102, or it can be located off line, such as with a remote RFID test station. Quality control system 104 can include one or more RFID readers 106 and RFID encoders 108, which can allow quality control system 104 to check products for errors in RFID encoding. Quality control system 104 can also include optical readers or scanners in any desired configuration, which can allow quality control system 104 to check products for errors in printing. Quality control system 104 can further include a die cutter, which can allow the system to separate improper or defective products so that they can be discarded or reprocessed. RFID products that are detected as being defective can be marked or otherwise identified so that they can be removed from the web or sheet during manufacturing or inspection or can be easily recognized by the customer so that the end user does not use the defective tag as part of RFID tag or label.

Figure 2:
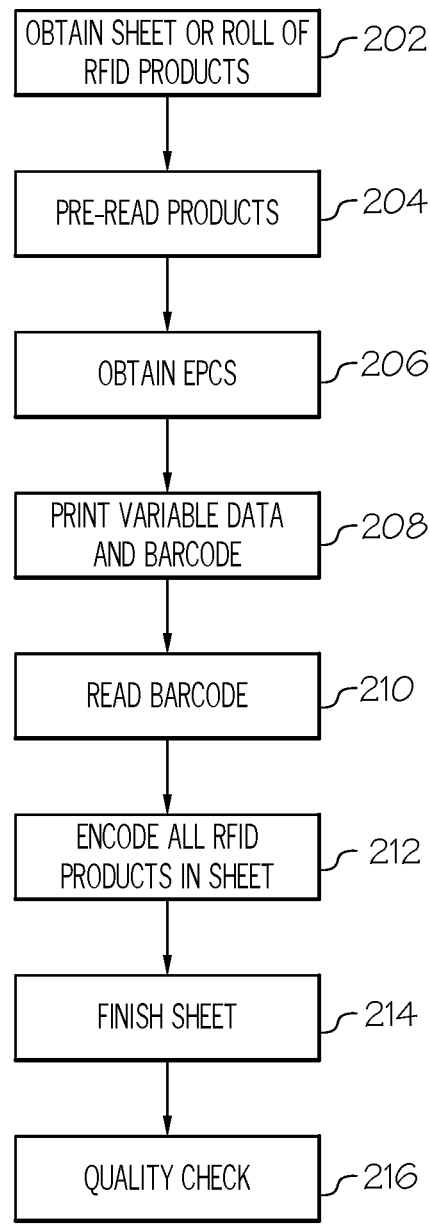
FIG. 2 shows an illustration of an exemplary embodiment of a printing/encoding process flow.

FIG. 2 shows an illustration of an exemplary embodiment of a process flow that makes use of system—printer/encoder 100. At step 202 a sheet or roll of RFID products can be obtained. The sheet or roll of material may have been previously manufactured to provide an antenna with a chip attached either directly to the antenna or through the use of a strap or interposer. The roll or sheet of RFID products can be provided on a paper substrate or on film or other suitable material. At step 204, the products may be pre-read to determine what information if any is encoded on the RFID chip, and requirements to be encoded or existing on the RFID chip can be associated with printer image requirements. At step 206, printer/encoder 100 can communicate with an outside database, such as over the Internet, to obtain appropriate Electronic Product Codes (EPCs). At step 208, print press 102 can print variable data such as a unique barcode, pricing information or other details relating to the goods or products for which the tag will be associated, onto the sheet of which will be use to create the tags or labels that can link printer image and RFID data requirements. At step 210, printer/encoder 100 may read the sheet barcode, or other machine readable indicia and program the sheet with RFID requirements inside the press feed track of print press 102. At step 212, print press 102 can use multiple RFID reader and encoder sets to program all of the RFID devices in the sheet or section of a roll at one time. At step 214, the sheet or section of a roll can be finished, for example by cutting holes or perforations to define individual tags or labels, and may then be separated into single tags or labels. At step 216, quality control system 104 can check the RFID devices and verify that the chips in the RFID devices are readable.

Referring generally to the figures, printer/encoder 100 can encode RFID devices using full encoding or it can encode RFID devices or products using partial encoding with the remainder of the coding to be completed by the end user such as a retail or brand owner. When using full encoding, printer/encoder 100 may fully program each RFID device or product individually. This programming can occur all at once (e.g. substantially simultaneously) or in stages, in an incremental fashion or as desired. When using partial encoding, printer/encoder 100 can program each RFID device or product with only a portion of the information that is to be stored on the products. This programming can occur all at once or in stages, as desired. For example, when using EPCs and partial encoding, printer/encoder 100 can receive a sheet of RFID products that have already been programmed with the portion of the EPCs that are common to all RFID products in the sheet, batch of sheets or roll. This can allow printer/encoder 100 to save time by only encoding each RFID device or product with variable information that is different for each product in the sheet or roll. In some embodiments, fixed data fields can be encoded and the unique chip identification number can be used as the serialization.

Figure 3:
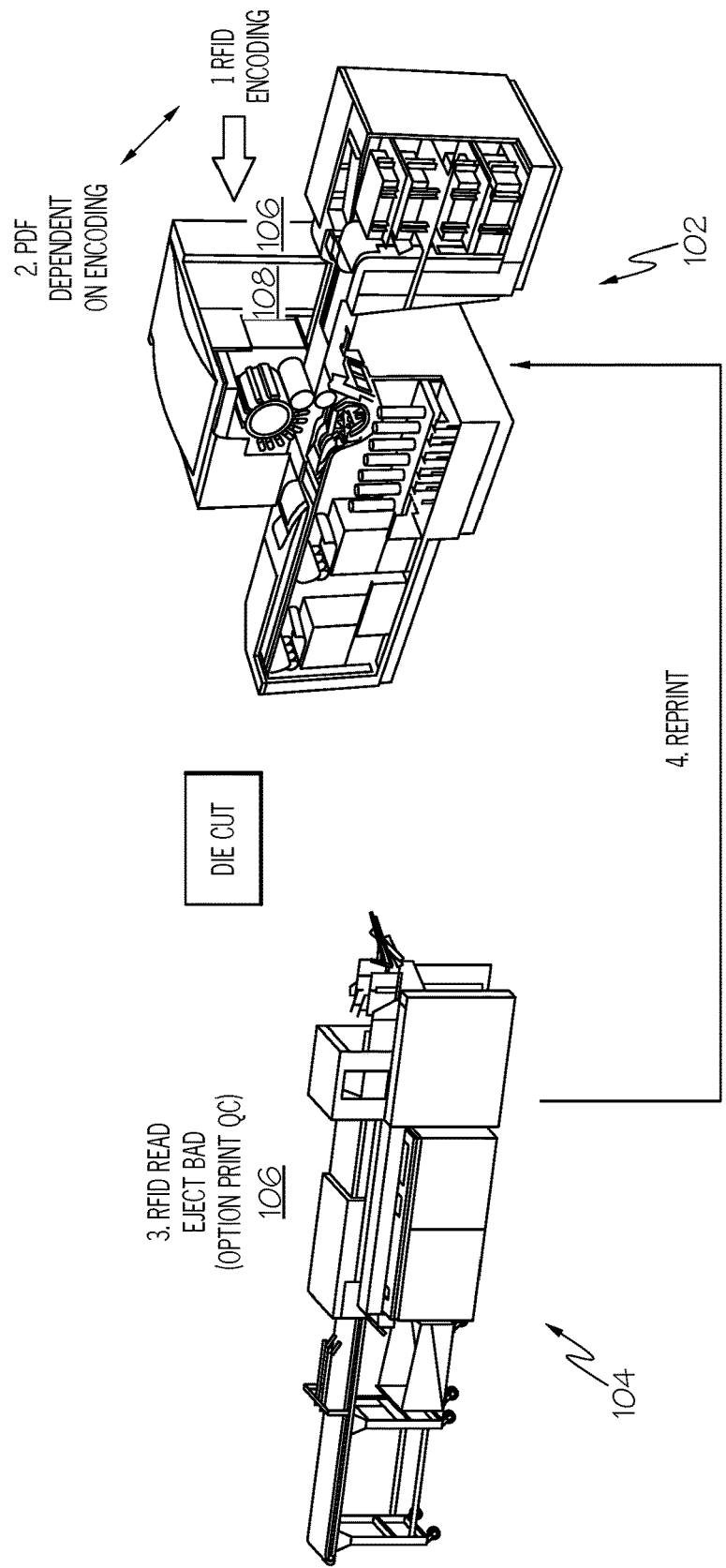
FIG. 3 shows an exemplary embodiment of a printing/encoding process in which full encoding is used, the encoding is done in line with the printing, and the image being printed is dependent on the information being encoded on the RFID.

FIG. 3 shows an exemplary embodiment of a printing/encoding process in which full encoding is used, the encoding is done in line with the printing, and the image being printed is dependent on the information being encoded on the RFID device or product. In this embodiment, RFID readers 106 and encoders 108 can be located on print press 102 before the printer or be adjacent the printing head, and RFID readers 106 can be located on quality control system 104 or adjacent the print head. Print press 102 can retrieve the EPC data and then encode the RFID device. Print press 102 can then create appropriate image data based on the EPC data/code and subsequently print the image on the surface of the sheet containing the RFID device or product. The RFID product can then be sent to quality control system 104, where it can be read and checked for accuracy. If necessary or desired, RFID products can be sent back to print press 102 for correction, marked as defective or removed from the sheet or roll so that they are not utilized by the customer or end user.

Figure 4:
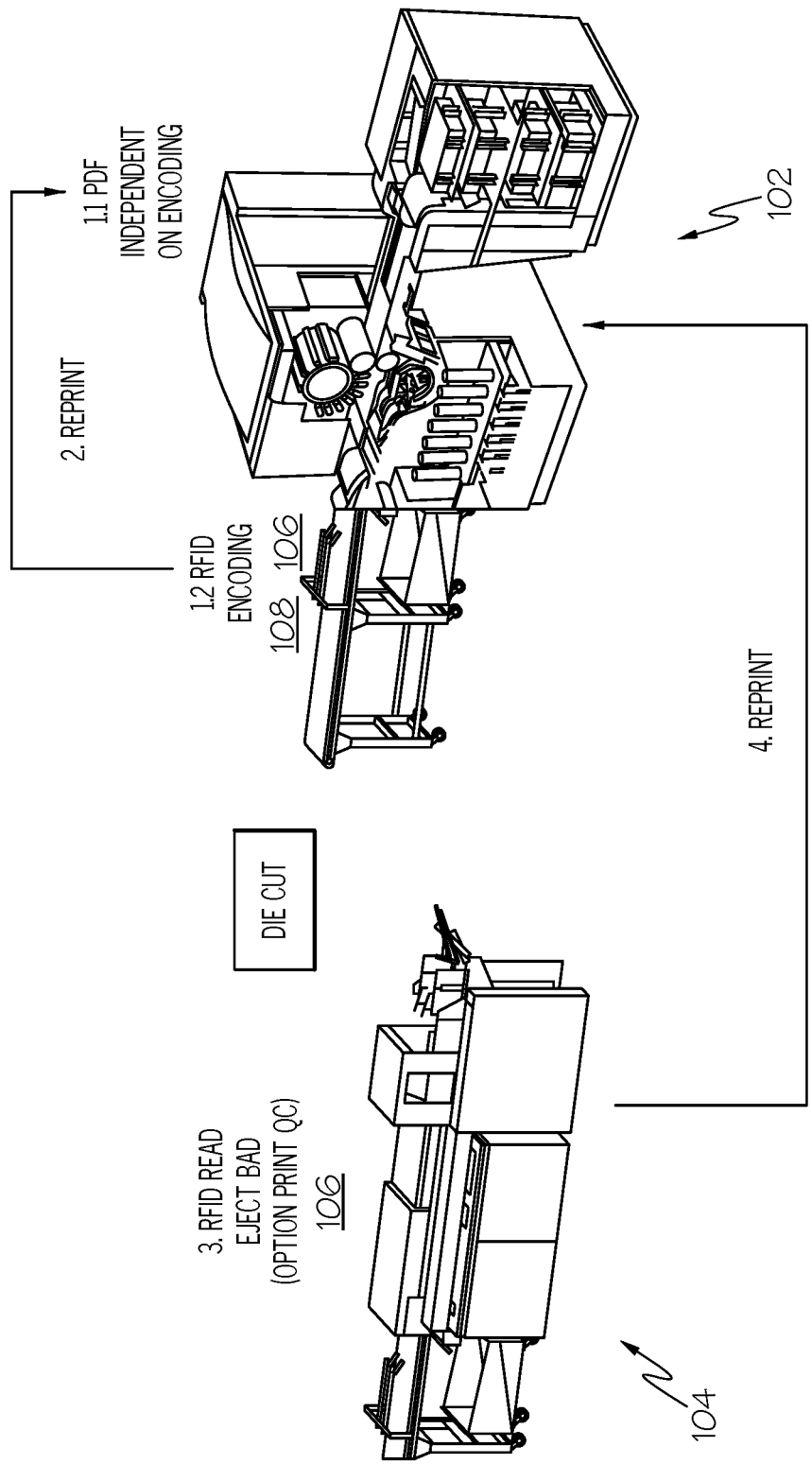
FIG. 4 shows an exemplary embodiment of a printing/encoding process in which full encoding is used, the encoding is done in line with the printing of the label/tag, and the image being printed is independent of the information being encoded on the RFID.

FIG. 4 shows an exemplary embodiment of a printing/encoding process in which full encoding may be used, the encoding can be done in line with the printing, and the image being printed can be independent of the information being encoded on the RFID. For example, the image being rendered can be a design or graphic, such as those relating to the retailer or brand owner or in connection with some other promotion, advertisement or marketing campaign. In this embodiment, RFID readers 106 and encoders 108 can be located on print press 102 after the printer, and RFID readers 106 can be located on quality control system 104. Print press 102 can retrieve the appropriate image data and EPC, print the image, and then encode the RFID device or product. The product can then be sent to quality control system 104, where it can be read and checked for accuracy. If necessary or desired, products can be sent back to print press 102 for correction, marked as defective or removed from the sheet or roll so that they cannot be used.

Figure 5:
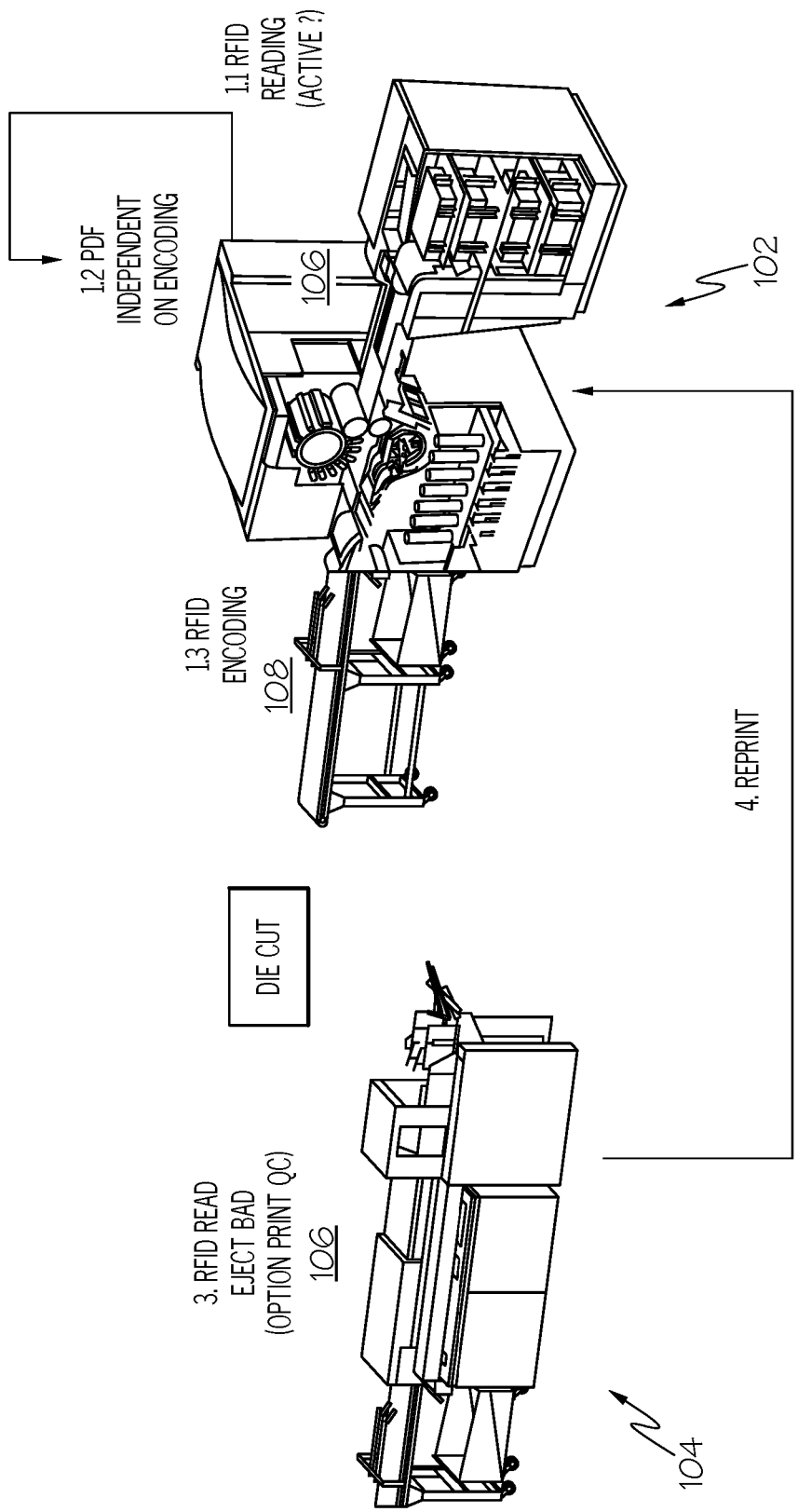
FIG. 5 shows an exemplary embodiment of a printing/encoding process in which full encoding is used, the encoding is done in line with the printing of the label/tag, and the image being printed is independent of the information being encoded on the RFID.

FIG. 5 shows an exemplary embodiment of a printing/encoding process in which full encoding can be used, the encoding can be done in line with the printing or post printing if preferred, and the image being printed can be independent of the information being encoded on the RFID chip. In this embodiment, RFID readers 106 can be located on print press 102 before the printer and on quality control system 104, and RFID encoders 108 can be located on print press 102 after the printer. Print press 102 can retrieve the appropriate image data, such as over the Internet or local database, and EPC, print the image, and then encode the RFID device with the EPC code and related consumer product information. The RFID product or device can then be sent to quality control system 104, where it can be read and checked for accuracy. If necessary or desired, products can be sent back to print press 102 for correction, marked as defective or in the alternative, removed from the roll or sheet so that it cannot be used. FIG. 5 also include a schematic representation of a die cutter which can be used to die cut individual labels or tags from the sheet or roll as needed.

Figure 6:
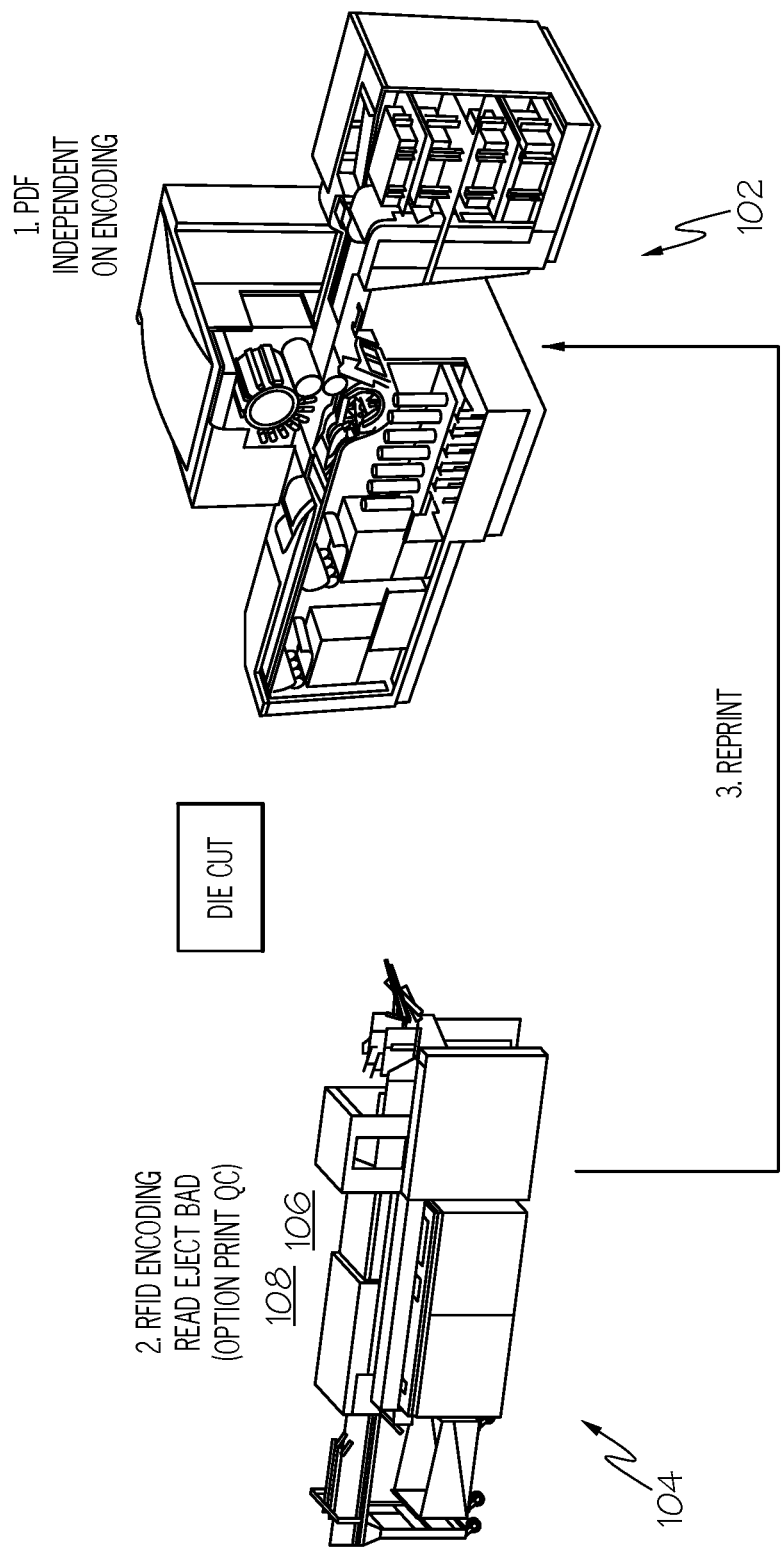
FIG. 6 shows an exemplary embodiment of a printing/encoding process in which full encoding is used, the encoding is done off of the printing line, and the image being printed is independent of the information being encoded on the RFID.

FIG. 6 shows an exemplary embodiment of a printing/encoding process in which full encoding can be used, the encoding can be done off of the printing line, and the image being printed, e.g. brand identifiers, trade information, graphics and the like, can be independent of the information being encoded on the RFID device. In this embodiment, RFID readers 106 and encoders 108 can be located on quality control system 104. Print press 102 can retrieve appropriate image data via a computer which controls the printing device and print or otherwise render the image. The RFID product can then be sent to quality control system 104, where it can be encoded with the proper EPC for the consumer goods with which it will be associated and then checked for accuracy. If necessary or desired, it can be sent back to print press 102 for correction, re-encoding, or removed from the sheet or web or marked as being defective.

Figure 7:
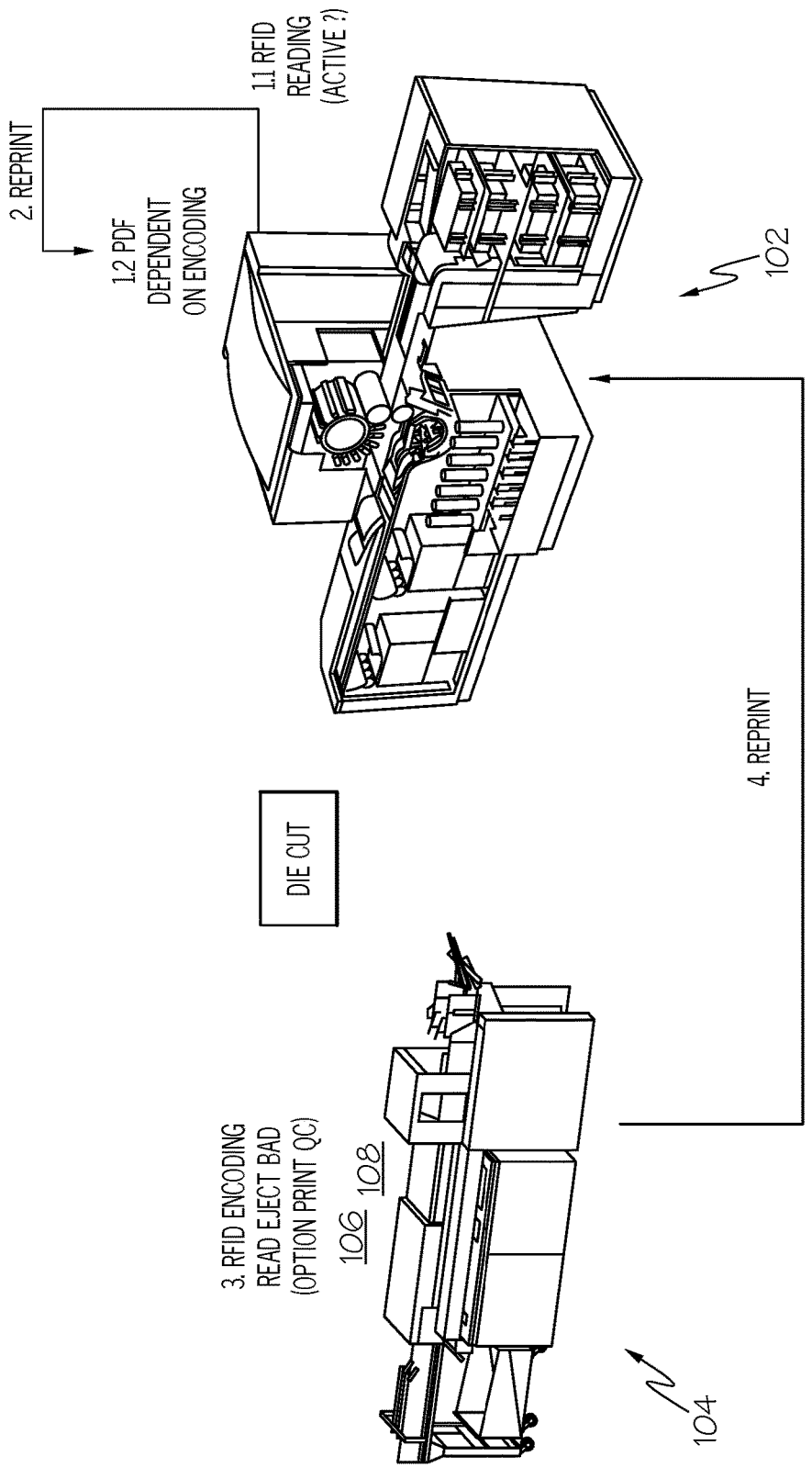
FIG. 7 shows an exemplary embodiment of a printing/encoding process in which full encoding is used, the encoding is done off of the printing line, and the image being printed is dependent on the information being encoded on the RFID.

FIG. 7 shows an exemplary embodiment of a printing/encoding process in which full encoding can be used, the encoding can be done off of the printing line, and the image being printed can be dependent on or related to the information being encoded on the RFID device or product. In this embodiment, RFID readers 106 can be located on print press 102 before the printer, so that the information that is encoded on the RFID device can be read and the information determined by the printer so that the appropriate image and information can then be printed, and RFID readers 106 and encoders 108 can be located on quality control system 104. In this embodiment, print press 102 can read the encoded information on the RFID product/device, and use it to retrieve appropriate image data, and print the image. The product can then be sent to quality control system 104, where it can be encoded with any additional EPC information that is necessary as well as consumer product information and then checked for accuracy. If necessary or desired, it can be sent back to print press 102 for correction, deletion, or marked as defective.

Figure 8:
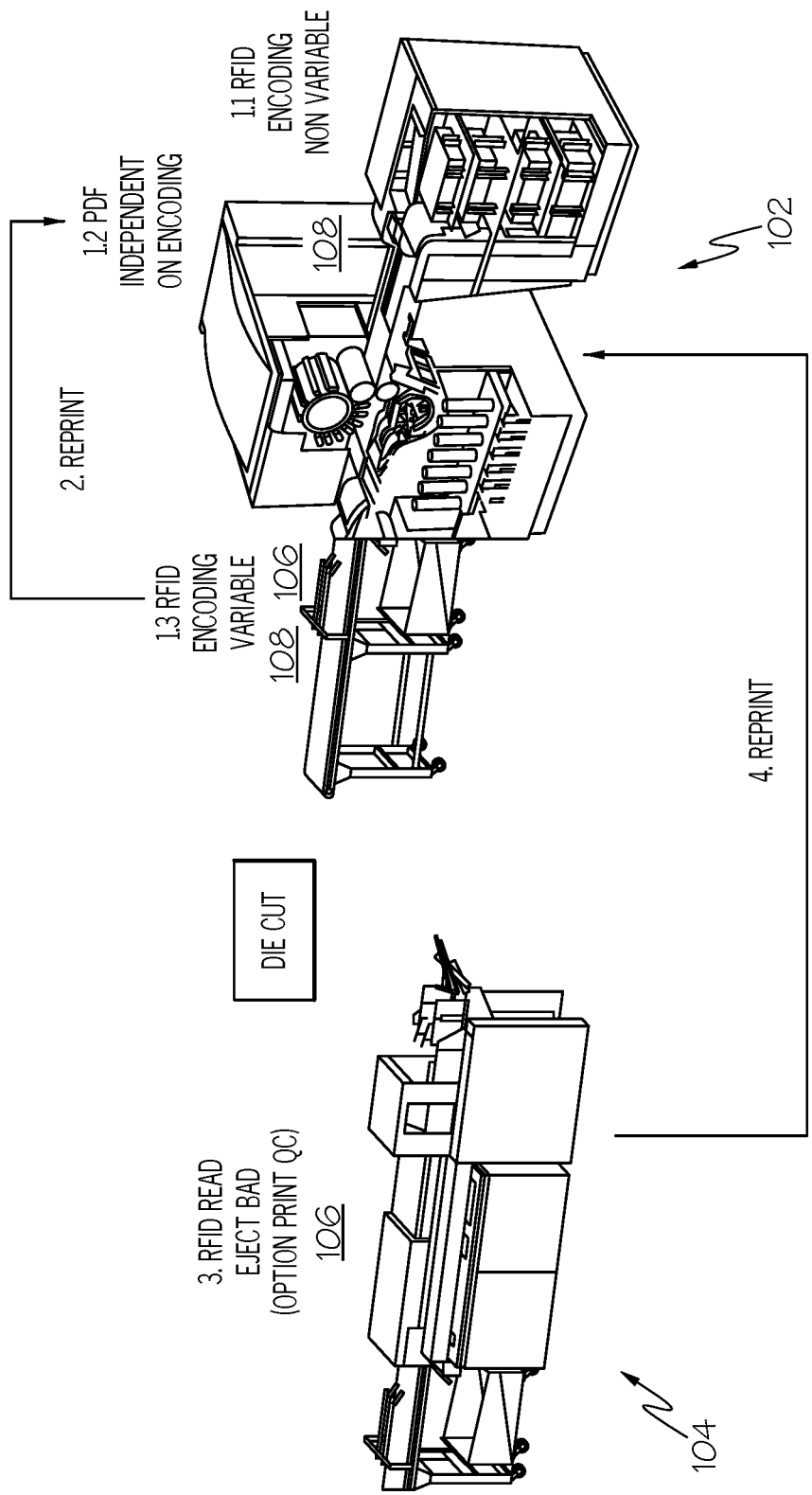
FIG. 8 shows an exemplary embodiment of a printing/encoding process in which partial encoding is used, the encoding is done in line with the printing, and the image being printed is dependent on the information being encoded on the RFID.

FIG. 8 shows a further exemplary embodiment of a printing/encoding process in which partial encoding can be used, the encoding can be done in line with the printing, and the image being printed can be independent of the information being encoded on the RFID device/product. In this embodiment, RFID encoders 108 can be located on print press 102 before the printer, RFID readers 106 and encoders 108 can be located on print press 102 after the printer, and RFID readers 106 can be located on quality control system 104. Print press 102 can encode the RFID device with a non-variable portion of the appropriate EPC, print the appropriate image, and then encode the RFID device with the variable portion of the EPC or other consumer product data. The RFID device/product can then be sent to quality control system 104, where it can be checked for accuracy. If necessary or desired, it can be sent back to print press 102 for correction, deletion or marked as defective.

Figure 9:
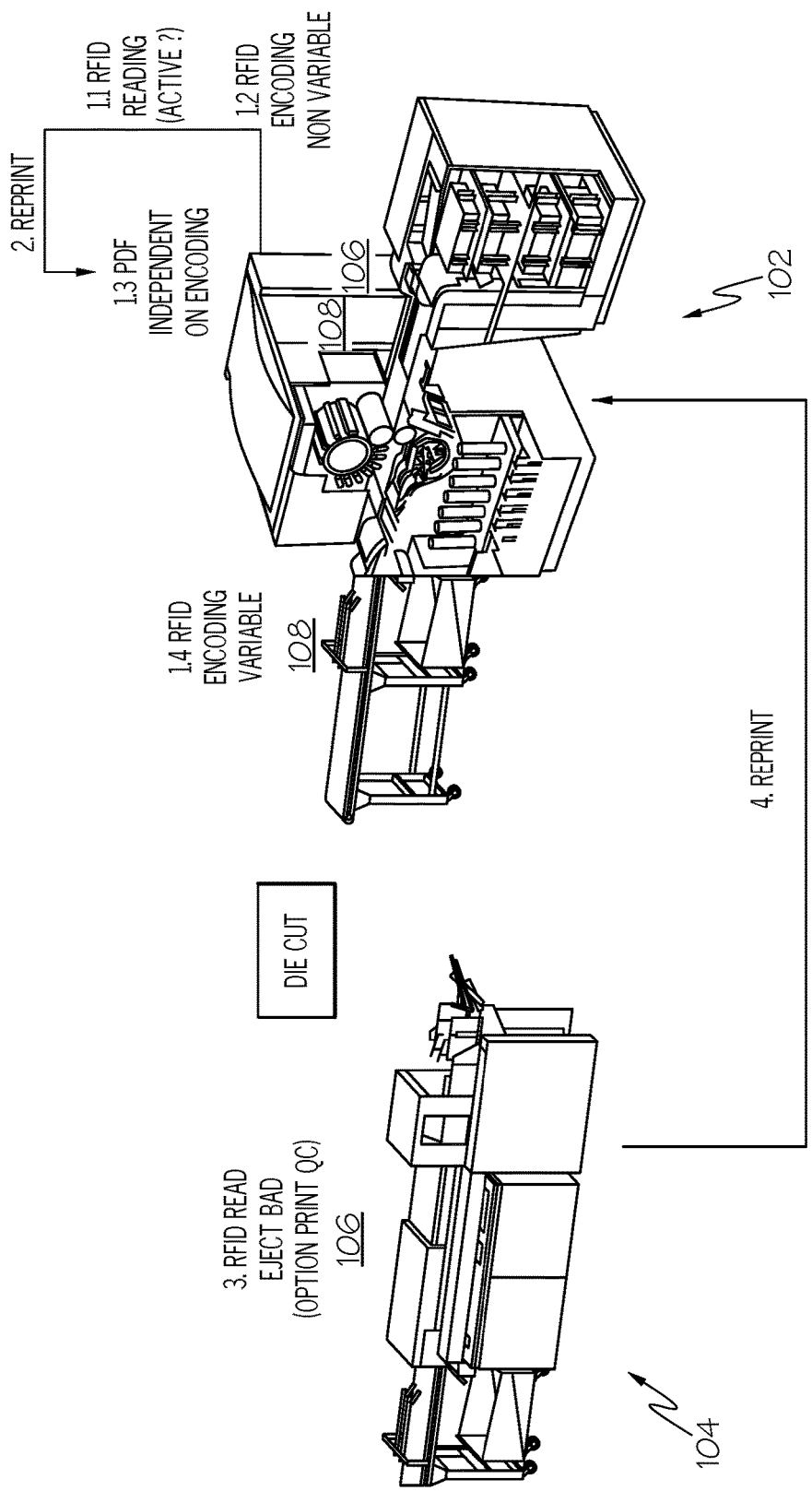
FIG. 9 shows an exemplary embodiment of a printing/encoding process in which partial encoding is used, the encoding is done in line with the printing, and the image being printed is independent of the information being encoded on the RFID.

FIG. 9 shows an exemplary embodiment of a printing/encoding process in which partial encoding can be used, the encoding can be done in line with the printing, and the image being printed can be independent of the information being encoded on the RFID device or product. In this embodiment, RFID readers 106 and encoders 108 can be located on print press 102 before the printer, RFID encoders 108 can be located on print press 102 after the printer, and RFID readers 106 can be located on quality control system 104. Print press 102 can encode the RFID device with a non-variable portion of the appropriate EPC, print the appropriate image, and then encode the RFID device with the variable portion of the EPC or other consumer product information to associate the RFID device/product with the consumer product. The RFID device/product can then be sent to quality control system 104, where it can be checked for accuracy. If necessary or desired, it can be sent back to print press 102 for correction, deletion, such as removal by a die cutter or punch device or marked as defective so that the RFID device/product is not used.

Figure 10:
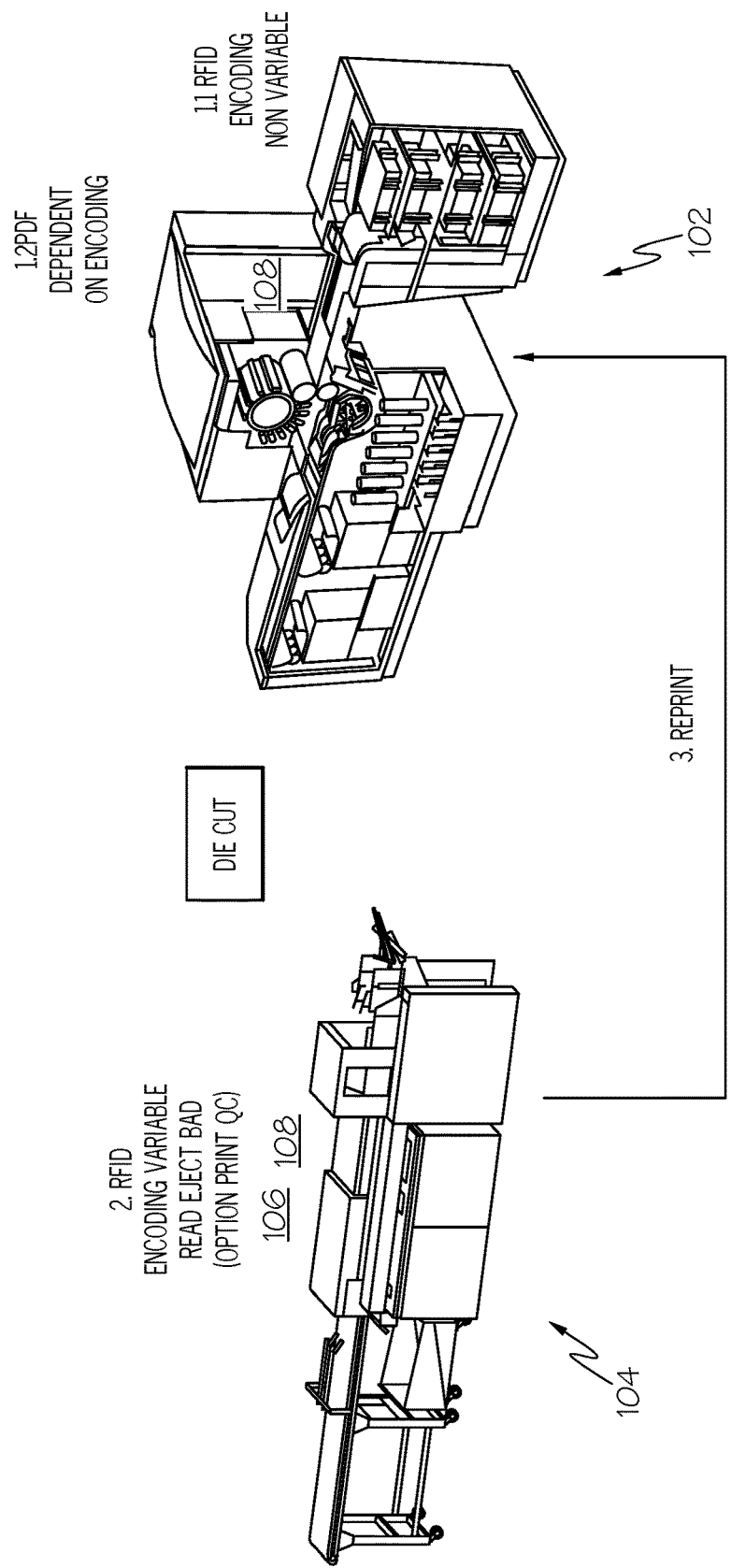
FIG. 10 shows an exemplary embodiment of a printing/encoding process in which partial encoding is used, the encoding is done off of the printing line, and the image being printed is dependent on the information being encoded on the RFID.

FIG. 10 shows an exemplary embodiment of a printing/encoding process in which partial encoding can be used, the encoding can be done off of the printing line, and the image being printed can be dependent on the information being encoded on the RFID device. In this embodiment, RFID encoders 108 can be located on print press 102 before the printer, and RFID readers 106 and encoders 108 can be located on quality control system 104. Print press 102 can encode the RFID device with a non-variable portion of the appropriate EPC, and print the appropriate image. The RFID device/product can then be sent to quality control system 104, where it can be encoded with the variable portion of the appropriate EPC or other consumer product information and then checked for accuracy. If necessary or desired, it can be sent back to print press 102 for correction deletion, such as removal by a die cutter or punch device or marked as defective so that the RFID device/product is not used.

Figure 11:
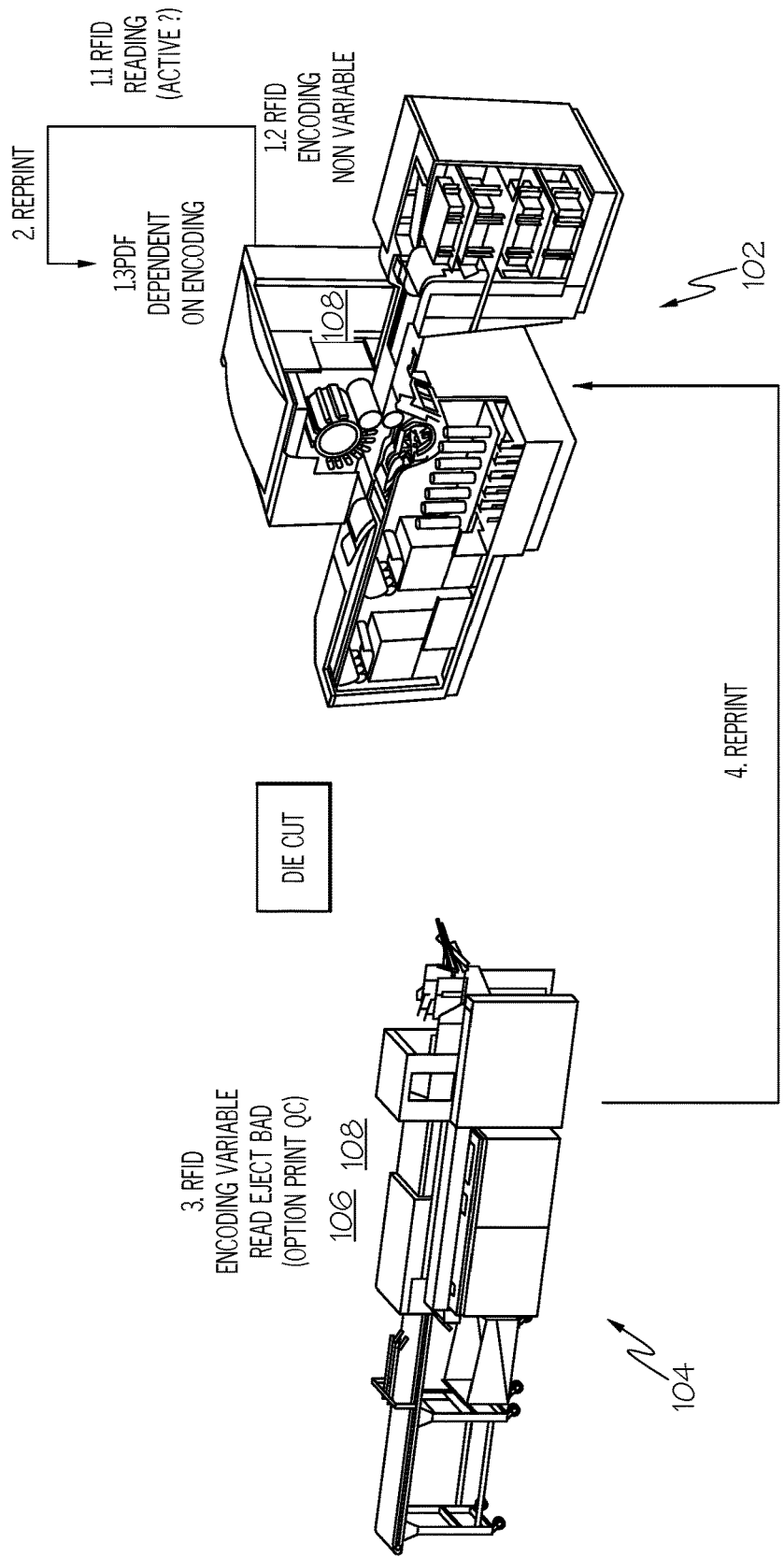
FIG. 11 shows an exemplary embodiment of a printing/encoding process in which partial encoding is used, the encoding is done off of the printing line, and the image being printed is independent of the information being encoded on the RFID.

FIG. 11 shows an exemplary embodiment of a printing/encoding process in which partial encoding can be used, the encoding can be done off of the printing line, and the image being printed can be independent of the information being encoded on the RFID device. In this embodiment, RFID readers 106 and encoders 108 can be located on print press 102 before the printer, and RFID readers 106 and encoders 108 can be located on quality control system 104. In this embodiment, print press 102 can encode the RFID device with a non-variable portion of the appropriate EPC and print the appropriate image. The product can then be sent to quality control system 104, where it can be encoded with the variable portion of the appropriate EPC or other information relating to the consumer product with which it will be associated and then checked for accuracy. If necessary or desired, it can be sent back to print press 102 for correction deletion, such as removal by a die cutter or punch device or marked as defective so that the RFID device/product is not used.

Figure 12:
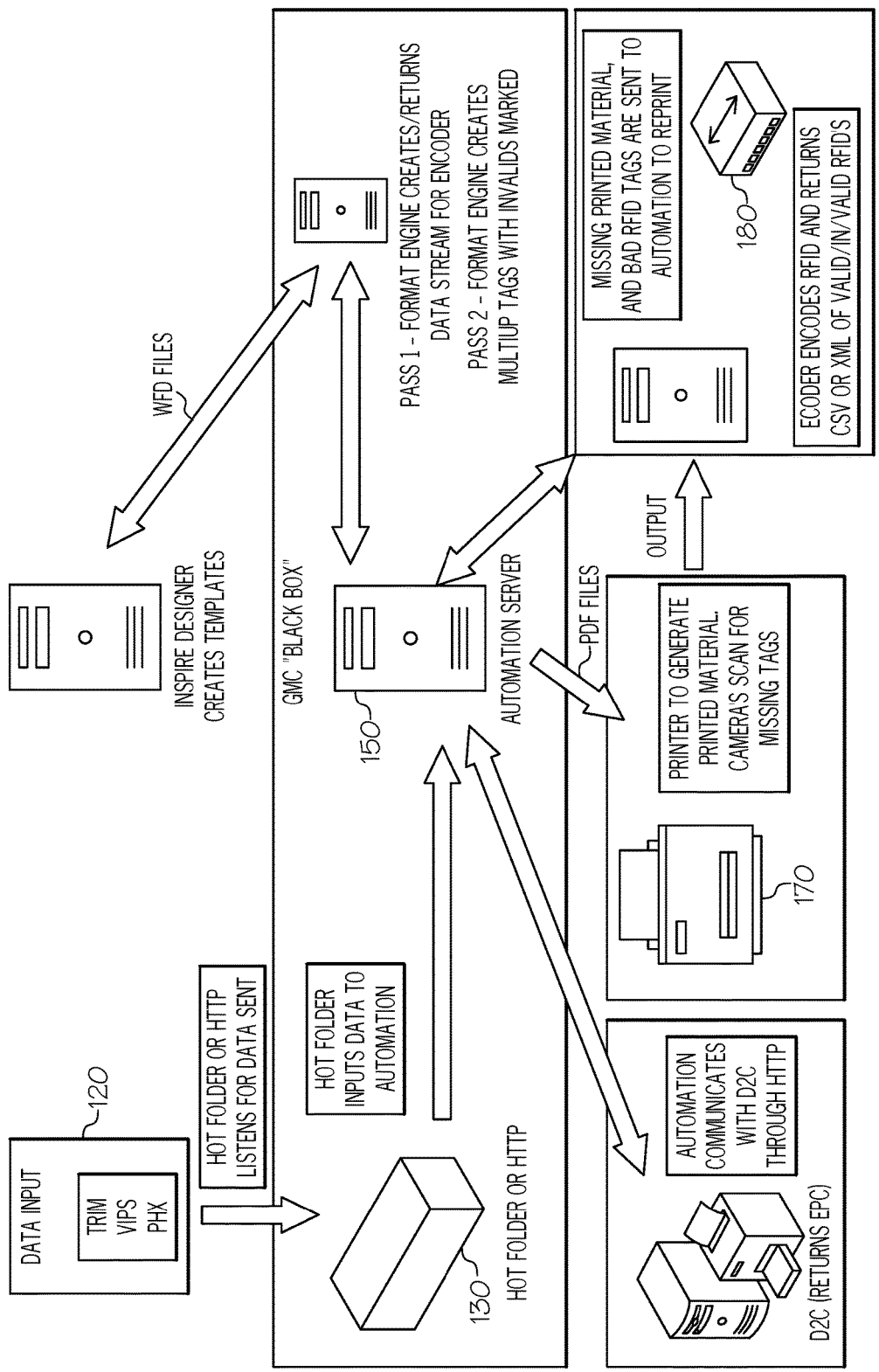
FIG. 12 shows an exemplary embodiment of a process for generating image data such as a PDF for a print process that uses full encoding and in which the image data is independent of the RFID encoding data.

FIG. 12 shows an exemplary embodiment of a process for generating image data such as a PDF for a print process that can use full encoding and in which the image data can be independent of the RFID encoding data. Generally, printer/encoder 100 can retrieve data and the appropriate EPC, create the image data, for example a PDF, encode the RFID device, quality check offline after cutting, and re-print if necessary or desired. Data input 120 contains information relating to the particular job that is to be created for a brand owner. The data is received and is placed in the "hot folder" 130 which establishes a queue for subsequent production for the order. Data from several orders is placed in the automation server 150. The automation server 150 also receives data from the returns server 160 which calculates jobs for encoding. The automation server 150 sends a proof command to generate a proof of the job to printer 170. The printer produces a machine readable images and then provides exemplary output to the reader encoder 180. The automation server 150 also communicates with the reader encoder 180 to provide job production and encoding information. Once information is complete, the automation server 150 provides job data to the printer 190 (printer 102 in earlier figures) to create tags. The printer also receives templates from the design server 195 to aid in the creation of the job.

Figure 13:
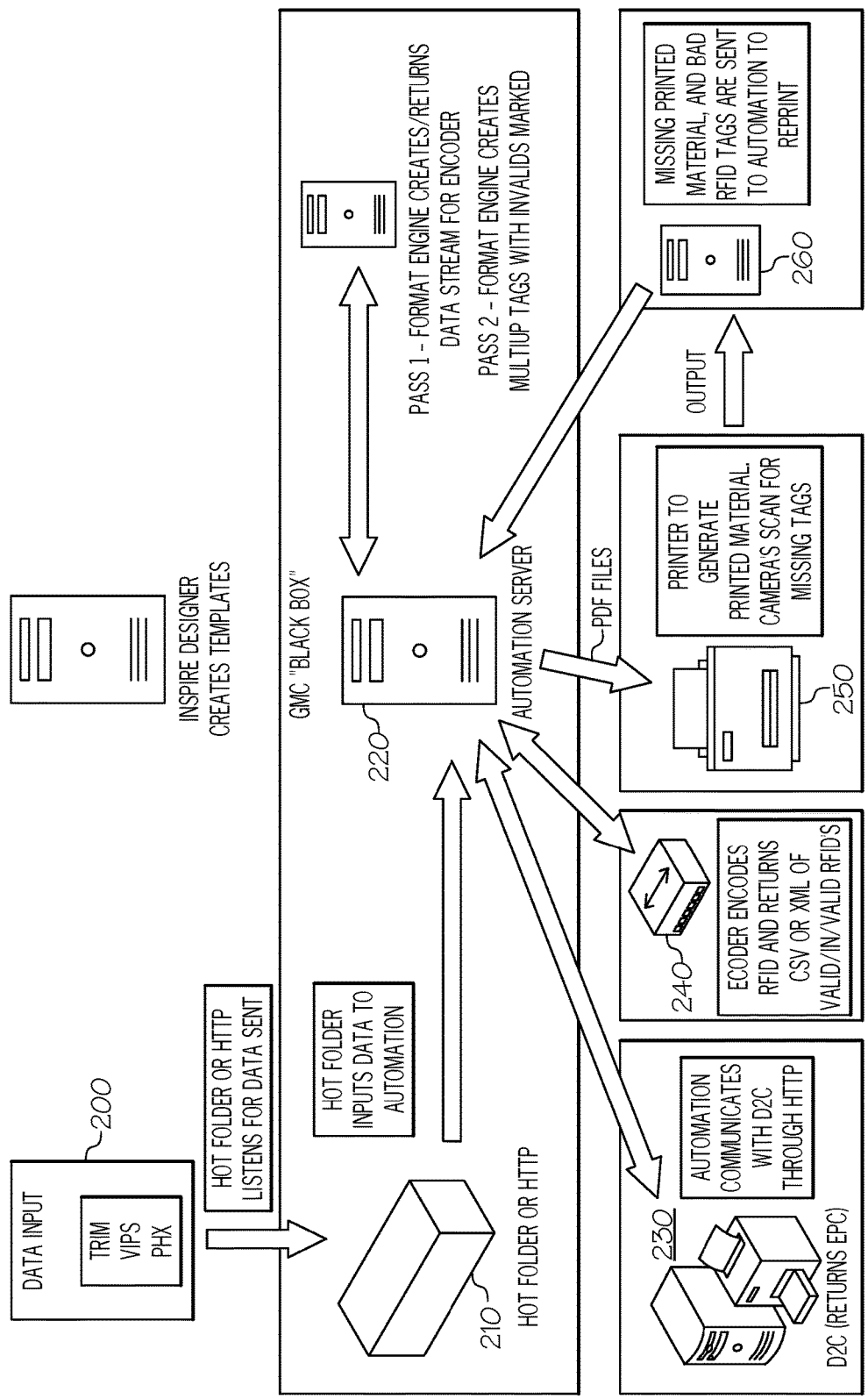
FIG. 13 shows an exemplary embodiment of a process for generating image data such as a PDF for a print process that uses full encoding and in which the image data is dependent on the RFID encoding data.

FIG. 13 shows an exemplary embodiment of a process for generating image data such as a PDF for a print process that can use full encoding and in which the image data may be dependent on the RFID encoding data. Generally, printer/encoder 100 can retrieve data and the appropriate EPC, encode the RFID device, create the image data, for example a PDF, quality check offline after cutting, and re-print if necessary or desired. In FIG. 13, data is received from data input source 200 and delivered to a "hot folder" 210 to input for sequencing. The hot folder 210 then delivers the information to the automation server 220. The automation server 220 receives additional input from the database 230 holding EPC information and the reader encoder 240. A print proof is then prepared by printer 250 based on information received from the automation server 220. Missing or bad tags with improperly encoded information are collected at database 260 and provided back to the automation server 220 after the print information from printer 250 is read and reviewed. Finally, the automation server 220 then provides the printer output to printer 270 (drives printer 102 in earlier figures) to create the print job.

Figure 14:
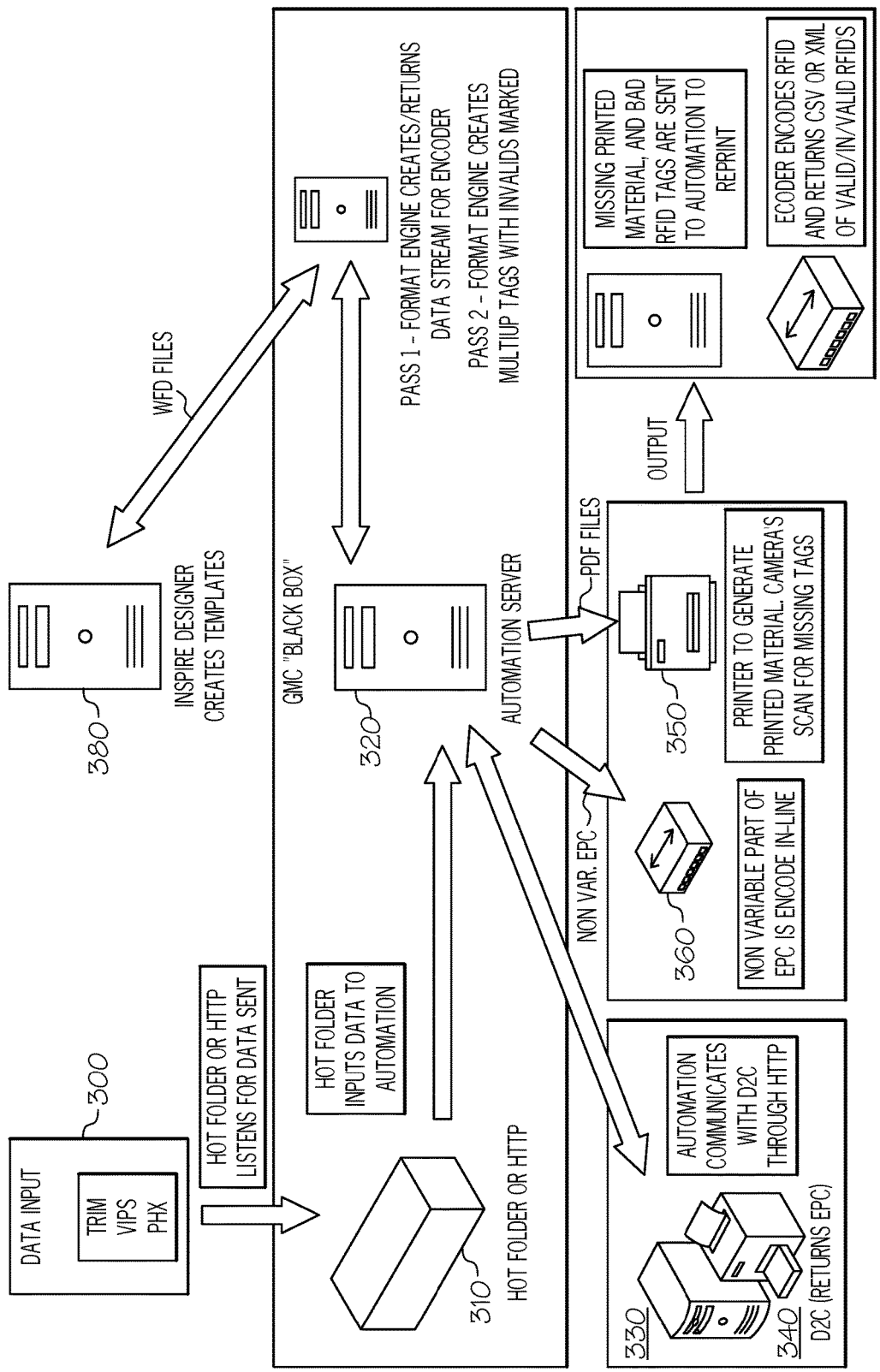
FIG. 14 shows an exemplary embodiment of a process for generating image data such as a PDF for a print process that uses partial encoding and in which the image data is independent of the RFID encoding data.

FIG. 14 shows an exemplary embodiment of a process for generating image data such as a PDF for a print process that can use partial encoding and in which the image data may be independent of the RFID encoding data. Generally, printer/ encoder 100 can retrieve data and the appropriate EPC, encode the RFID device with the non-variable portion of an EPC, create the image data, for example a PDF, encode the RFID device with the variable portion of an EPC quality check offline after cutting, and re-print if necessary or desired. Data is received from the data input device 300 and contains information relating to a print job or customer order received for printing. The data is presented to a hot folder 310 which then sequences jobs for production. The hot folder 310 transfers data to the automation server 320 which collects information from the EPC server 330 on the particular job to be rendered. The automation server 320 sends information to the non-variable part of the EPC database 340 and to the printer 350 to generate an image for use in the machine vision system scanning and reading the document created by the printer 350. Data is received by the encoder 360 and missing or incomplete information is transferred back to the automation server 320. Data is then communicated from the automation server 320 to the printer 370 to render the particular tags, labels and the like and to complete the encoding of the RFID devices. The printer 370 may also receive template and other information from the designer database 380.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A process for printing and encoding RFID products, comprising the steps of:
    obtaining a sheet or roll having a plurality of RFID devices;
    pre-reading each of the RFID devices;
    obtaining Electronic Product Codes;
    printing variable data and a barcode onto the sheet or roll;
    reading the barcode with the print encode device provided during the step of printing;
    encoding all the RFID devices in the sheet or roll such that the RFID devices are read and encoded as part of a continuous process and the encoding and printing occurs substantially simultaneously; where printer/encoder can encode RFID devices using one of full encoding or partial encoding and when partial encoding a remainder of coding is completed by an end user;
    finishing the sheet or roll to form individual labels or tags;
    checking the RFID devices to verify that they are encoded with information relating to the barcode.

2. The process for printing and encoding RFID devices of claim 1, wherein the pre-reading the RFID products includes a further step of associating RFID requirements with printer image requirements.

3. The process for printing and encoding RFID devices of claim 1, wherein the step of obtaining Electronic Product Codes includes communicating with an outside database to obtain appropriate Electronic Product Codes.

4. The process for printing and encoding RFID devices of claim 1, wherein the step of printing variable data and a barcode onto the sheet or roll links the variable printed material and any RFID data requirements obtained from pre-reading each of the RFID devices.

5. The process for printing and encoding RFID devices of claim 1, wherein encoding is done inside the press feed track of a print press of the print encode device.

6. The process for printing and encoding RFID devices of claim 1, wherein the RFID products in the sheet are encoded at the same time.

7. The process for printing and encoding RFID devices of claim 1, wherein the step of finishing includes cutting holes or perforations.

8. The process for printing and encoding RFID devices of claim 1, wherein the step of finishing includes separating the RFID products into individual tags or labels.

9. The process for printing and encoding RFID devices of claim 1, wherein a quality control system performs checking the RFID devices to verify that they are encoded with correct information.

10. The process for printing and encoding RFID devices of claim 1, wherein the encoding is partial encoding.

11. The process for printing and encoding RFID devices of claim 10, wherein the RFID devices have already been programmed with a portion of the Electronic Product Codes that are common to all of a group of products to be related to the RFID devices in the sheet or roll.

12. The process for printing and encoding RFID devices of claim 1, wherein the encoding is done in line with the printing.

13. The process for printing and encoding RFID devices of claim 1, wherein the encoding is done off of the printing line.

14. The process for printing and encoding RFID devices of claim 1, wherein the printed material is distinct from the information being encoded on the RFID device.

15. The process for printing and encoding RFID devices of claim 1, further including the step of sending the RFID products back to the printer/encoder for correction after the step of checking.

* * * * *